United States Patent [19]
Kim

[11] Patent Number: 5,880,875
[45] Date of Patent: Mar. 9, 1999

[54] LIGHT AMPLIFIER HAVING A MULTI-STAGE OPTICAL ISOLATOR

[75] Inventor: Yeong-Ju Kim, Gumi, Rep. of Korea

[73] Assignee: SamSung Electronics Co., Ltd., Suwon, Rep. of Korea

[21] Appl. No.: 685,553

[22] Filed: Jul. 24, 1996

[30] Foreign Application Priority Data

Aug. 4, 1995 [KR] Rep. of Korea ............... 24143/1995

[51] Int. Cl.⁶ .............................. G07B 6/37; H01S 3/06; G11B 7/00
[52] U.S. Cl. ..................... 359/341; 359/349; 372/703
[58] Field of Search ............................ 359/341, 349; 372/703; 385/11, 31, 34

[56] References Cited

U.S. PATENT DOCUMENTS

| | | | |
|---|---|---|---|
| 4,375,910 | 3/1983 | Seki | 385/34 |
| 4,615,582 | 10/1986 | Lefeuere et al. | 372/703 |
| 5,191,467 | 3/1993 | Kapany et al. | |
| 5,204,771 | 4/1993 | Koga | 359/484 |
| 5,278,853 | 1/1994 | Shirai et al. | |
| 5,299,056 | 3/1994 | Kurata et al. | |
| 5,315,431 | 5/1994 | Masuda et al. | |
| 5,317,655 | 5/1994 | Pan | 385/11 |
| 5,345,329 | 9/1994 | Shirai et al. | |
| 5,408,354 | 4/1995 | Hosokawa | |
| 5,434,702 | 7/1995 | Byron | |
| 5,446,813 | 8/1995 | Lee et al. | |
| 5,493,440 | 2/1996 | Souda et al. | |
| 5,499,132 | 3/1996 | Tojo et al. | |
| 5,502,591 | 3/1996 | Semenkoff et al. | |
| 5,588,078 | 12/1996 | Chung et al. | 372/703 |
| 5,642,448 | 6/1997 | Pan et al. | 385/31 |

FOREIGN PATENT DOCUMENTS

| | | |
|---|---|---|
| 9513790 | 6/1995 | Australia . |
| 0 491 607 A2 | 6/1992 | European Pat. Off. . |
| 9022026 | 2/1984 | Japan . |
| 1055623 | 3/1986 | Japan . |
| 4264516 | 9/1992 | Japan . |
| 5215990 | 8/1993 | Japan . |

*Primary Examiner*—Nelson Moskowitz
*Attorney, Agent, or Firm*—Robert E. Bushnell, Esq.

[57] ABSTRACT

A light amplifier is constructed with only one multi-stage optical isolator so as to reduce the size thereof and to lower the fabrication cost thereof. The multi-stage optical isolator has two input ports and two output ports for cutting-off a reverse flow of a forwarding light when a following input light enters a first input port and when an output light enters a second input port. A source pump generates light used to amplify weak input light. A wavelength division multiplexer division-modulates wavelengths of the light generated by the source pump and the light forwarded through the multi-stage optical isolator. An optical fiber amplifies the light from the wavelength division multiplexer, and emits the amplified light through the first port of the multi-stage optical isolator.

7 Claims, 5 Drawing Sheets

LIGHT AMPLIFIER HAVING A MULTI-STAGE OPTICAL ISOLATOR

CLAIM OF PRIORITY

This application make reference to, incorporates the same herein, and claims all benefits accruing under 35 U.S.C §119 from an application entitled A LIGHT AMPLIFIER HAVING A MULTI-STAGE OPTICAL ISOLATOR earlier filed in the Korean Industrial Property Office on the 4th day of Aug. 1995, and there duly assigned Ser. No. 1995/24143.

BACKGROUND OF THE INVENTION

1. Field of the Invention

The present invention relates to light amplification processes and to light amplifiers, and more particularly to a light amplifier provided with one multi-stage optical isolator in which a multi-stage connection is realized, thereby reducing a size thereof and cutting off a reverse flow of a forwarding light.

2. Description of the Related Art

A conventional light amplifier is normally constructed with a first optical isolator connected to a wavelength division multiplexer which is, in turn, connected to an optical fiber which, in turn, connected to a second optical isolator. A representative of a convention light amplifier of this type is shown for example, by the Optical Amplifier With A Doped Fluoride Glass Of Optical Fibre And Process For Producting Said Amplifier of Sememkoff, et al., U.S. Pat. No. 5,502,591. Light passing through the first optical isolator is modulated in the wavelength division multiplexer together with light from a source pump. The light is amplified by the optical fiber and then passed through the second optical isolator. I have found that Sememkoff, et al. '591 in fact relies upon the use of a pair of wavelength division multiplexer and source pumps, and could be improved with the use of a single wavelength division multiplexer and pump. I have also realized that with conventional light amplifiers relying upon two or more optical isolators, there has been a problem because an optical isolator is larger in size than the other elements, thereby unnecessarily causing the size and fabrication costs of the light amplifier to be increased, sometimes to the point of unwieldiness.

I have also discovered that another problem is attribuitble to generation of high connection losses between the optical fiber and the optical isolator because contemporary designs all too often require a light amplifier to use at least two optical isolators.

Souda, et al., U.S. Pat. No. 5,493,440 describes an Optical Isolator And Optical Fiber Amplifier that uses a multi-stage optical isolator with an amplifier. FIG. 24 of Souda, et al., for example, shows an amplifier while FIGS. 2 and 8 of Souda, et al. illustrates multi stage optical isolators. I have noticed that the optical isolator of Souda, et al. positions all four ports on one side of the isolator rather than having two input ports on one side and two output ports on the other side of the isolator. Also, I have found that the magnetic optical element of Souda, et al., has a relatively large polarizing rotation of 225 degrees, while the optical isolator of Souda et al, attempts to use but a single birefringent element. Moreover, I have found that the use of a single lens in the optical isolator of Souda, et al. requires an additional mirror and compensator. Accordingly, contemporary designs for optical fiber amplifiers represented by Souda et al, do not represent the best optical design practice.

SUMMARY OF THE INVENTION

Accordingly, it is an object of the present invention to provide a process and device exhibiting improved light amplification.

It is another object to provide a process and light amplifier able to effectively employ an one multi-stage optical isolator.

It is still another object to provide a process and light amplifier having a reduced size and manufacturing cost.

It is yet another object to provide a process and light amplifier characterized by reduced connection losses between the optical fiber and the optical isolator.

It is still yet another object to provide a process and light amplifier able to lower connection losses while using only a one multi-stage optical isolator.

These and other objects may be achieved with a light amplifier utilizing a multi-stage optical isolator in which a multi-stage connection is realized. The amplifier may be constructed with a multi-stage optical isolator having two input ports and two output ports for cutting-off a reverse flow of forwarding light when a forwarding input light is forwards to a first input port and when an output light is forwards to a second input port. A source pump generates light to amplify applied weak light. A wavelength division modulator division-modulates wavelengths of the light generated from the source pump and the light forwarding through the multi-stage optical isolator. An optical fiber amplifies light from the wavelength division multiplexer and thereby emits the amplified light through the first port of the multi-stage optical isolator.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
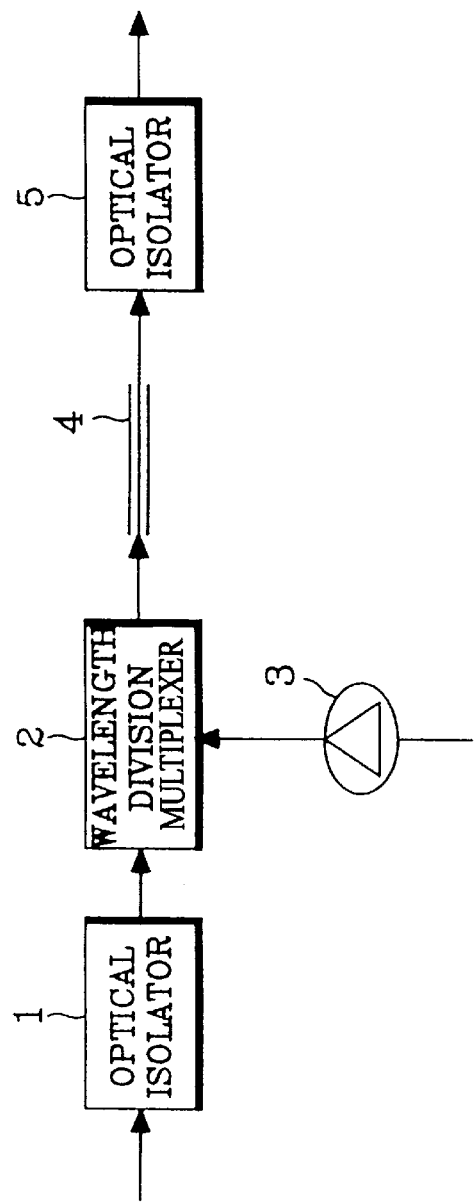
FIG. 1 is a schematic diagram illustrating a hypothetical representation of the construction of a conventional light amplifier.

Turning now to the drawings, FIG. 1 is a view illustrating a schematic construction of a representation of what may be described as a composite incorporating salient features in an effort to illustrate a hypothetical conventional light amplifier. A conventional light amplifier (for example, an erbium doped fiber amplifier) is provided with at least two optical isolators. As shown in FIG. 1, light input through an optical fiber of an input terminal passes through an optical isolator 1 of the input terminal, so that the reverse flow of the forwarding light is cut off. The light passing through optical isolator 1 is modulated together with light from a source pump 3 in a wavelength division multiplexer 2, and then output to an optical fiber 4 (for example, an erbium doped fiber). The wavelength of the light from source pump 3 is 980 or 1480 nm. The amplified light passing through an optical fiber passes through optical isolator 5 to an output terminal, optical isolator 5 being utilized in the same fashion as in the optical isolator 1 connected to the input terminal. Optical isolator 5 cuts off the reverse flow of the forwarding light in a connection portion between an element and the optical fiber, and outputs the forwarding light therefrom.

Figure 2:
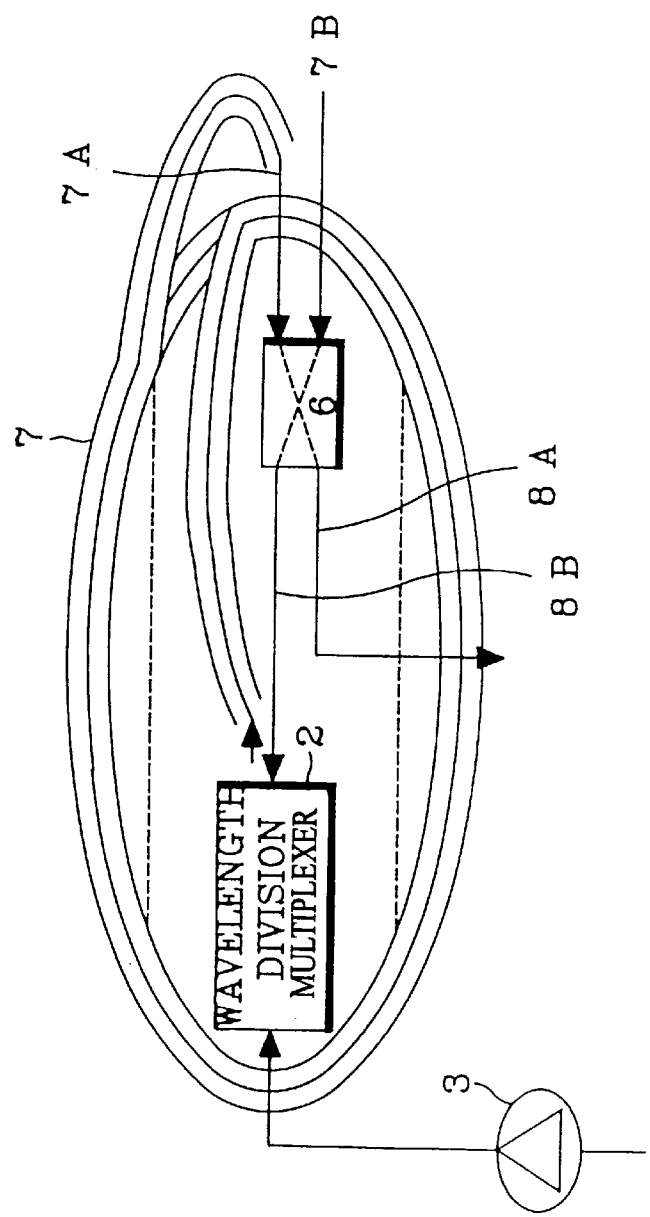
FIG. 2 is a view illustrating a construction of a light amplifier utilizing a multi-stage optical isolator according to the principles of the present invention.

FIG. 2 is a view illustrating the construction of a light amplifier utilizing a multi-stage optical isolator constructed according to the principles of the present invention. Multi-stage optical isolator 6 has two input ports 7A and 7B, and two output ports 8A and 8B for cutting-off a reverse flow of a forwarding light when a forwarding input light is forwarded to a first input port 7A and when an output light is forwarded to a second input port 7B. Source pump 3 generates light used to amplify the input weak light. Wavelength division multiplexer 2 division-modulates wavelengths of the light forwarded through multi-stage optical isolator 6 and the light generated by source pump 3. Optical fiber 7 amplifys light from wavelength division multiplexer 2, and conducts the amplified light from first input port 7A of multi-stage optical isolator 6.

Figure 3:
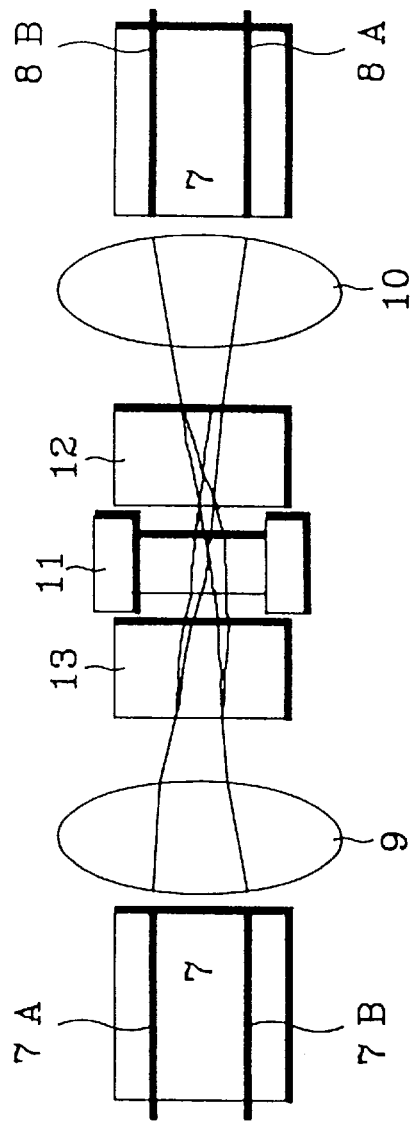
FIG. 3 is a view illustrating a construction of a multi-stage optical isolator constructed according to the principles of the present invention.

FIG. 3 is a view illustrating a construction of a multi-stage optical isolator according to the principles of the present invention. The multi-stage optical isolator may be constructed with first lens 9 for focusing input light. First birefringent lens 13 divides the focused light into vertically and horizontally polarized light. Faraday rotator 11 shifts the phase of the polarized light divided by first birefringent lens 13 and second birefringent lens 12 focuses the phase-shifted light from Faraday rotator 11. Second lens 10 irradiates the light focused by second birefringent lens 12 to a corresponding optical fiber.

Figure 4:
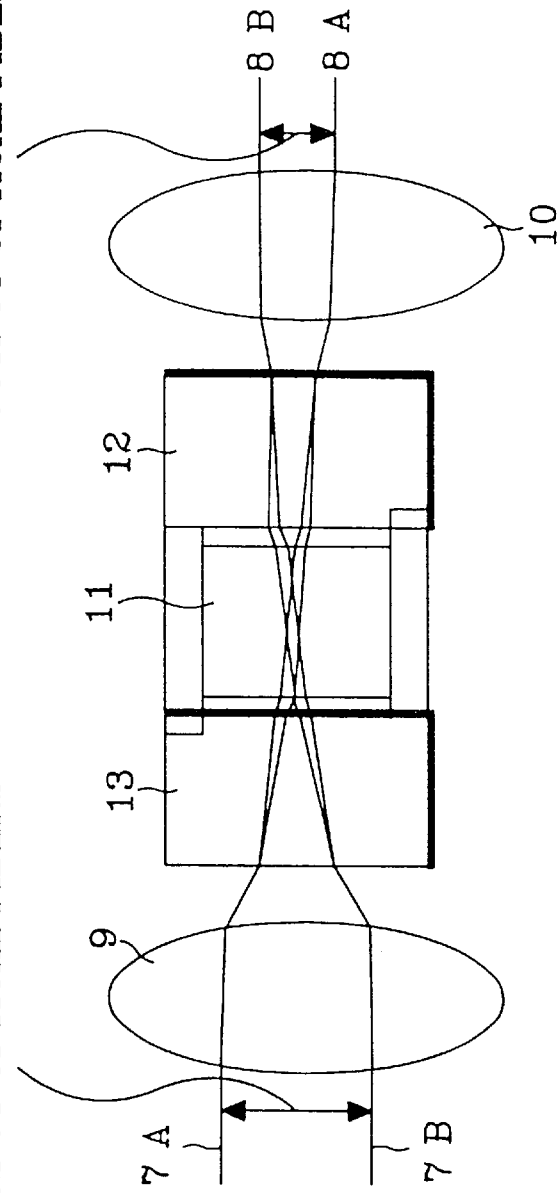
FIG. 4 is a view illustrating a light forwarding mechanism and a light position within a multi-stage optical isolator constructed according to the principles of the present invention.
Figure 5:
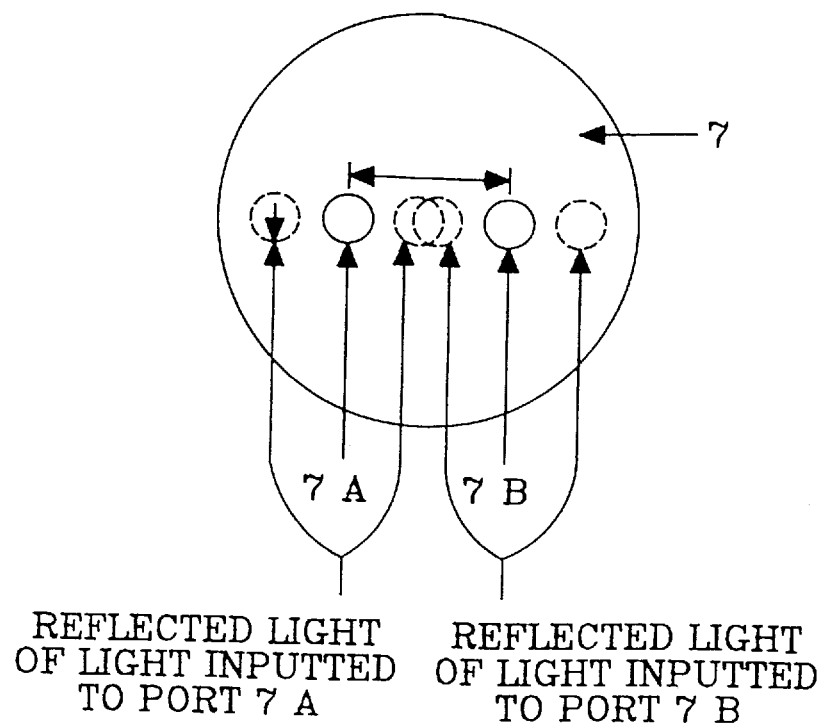
FIG. 5 is a view illustrating a position of an optical fiber and a position of a reverse-flowed light from a cross-section of an optical fiber ferrule constructed according to the principles of the present invention.
Figure 6:
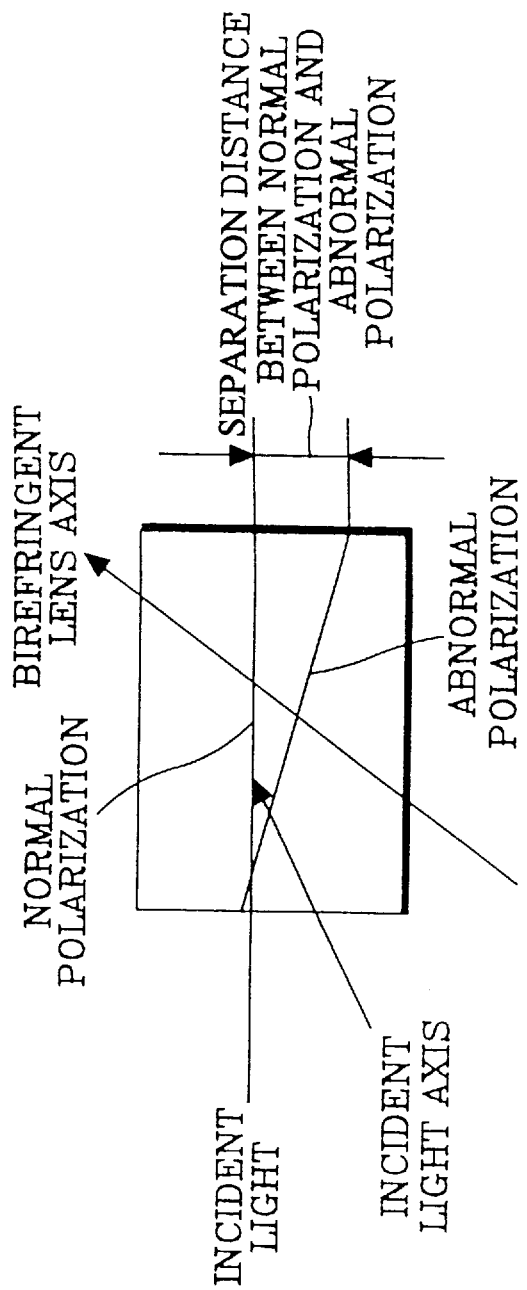
FIG. 6 is a view illustrating a course and a separate degree of a light within a birefringent lens constructed according to the principles of the present invention.
Figure 7:
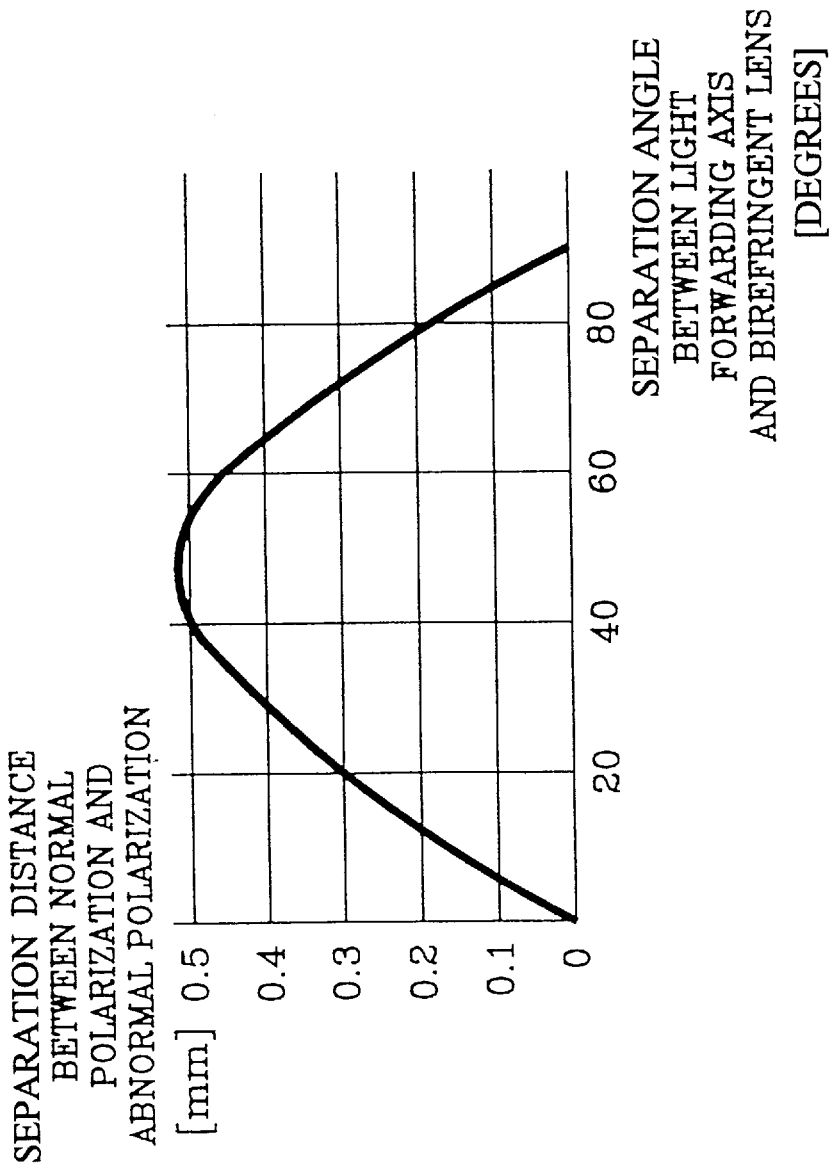
FIG. 7 is a two coordinate graph illustrating separation angle between the forwarding axis and the birefringent lens in degrees, as a function of the distance of separation between normal polarization and abnormal polarization measured in millimeters, according to the practice of the present invention.

FIG. 4 is a view illustrating a light forwarding mechanism and a light position within the multi-stage optical isolator according to the present invention. FIG. 5 is a view illustrating a position of an optical fiber and a position of a reverse-flow light from a cross-section of an optical fiber ferrule according to the present invention. FIG. 6 is a view illustrating the passage of the light within a birefringent lens according to the present invention. FIG. 7 is a graph diagram illustrating the separation distance of the light with respect to the angle between a birefringent lens and a light forwarding direction according to the present invention.

A light amplifier constructed according to the principles of the present invention is described below with reference to FIGS. 1 through 7, collectively. Light is incident on second input port 7B as an input port of the multi-stage optical isolator through the optical fiber, thereby to be incident on one input terminal of wavelength division multiplexer 2 though the optical fiber. Multi-stage optical isolator 6 is utilized for preventing the light from traveling in the reverse direction when two optical fibers or an element and the optical fiber are respectively connected to each other. Describing multi-stage optical isolator 6 in more detail with reference to FIG. 3, the light incident through the optical fiber passes through an upper portion of first lens 9 and then is incident on first birefringent lens 13 made of a polarization material $TiO_2$. The incident light passes through first birefringent lens 13, and is divided into vertical (normal)/horizontal (abnormal) polarized light. If the length of first birefringent lens 13 is 5 millimeters, then the separation distance of the light is 500 micrometers at a maximum. The light separated by passing through first birefringent lens 13 passes through Faraday rotator 11, and its phase is shifted by forty-five degrees. The phase shifted light, after passing through Faraday rotator 11, passes through second birefringent lens 12. As a result, the light which was separated by first birefringent lens 13 is united by shifting phase by Faraday rotator 11 and then passing it through second birefringent lens 12. The united light enters to optical fiber 7 connected through second lens 10. The light reflected on a cross-section of optical fiber 7 passes through second lens 10 and then is again divided into optical (normal)/horizontal (abnormal) polarized light in second birefringent lens 12. The separated light then passes through Faraday rotator 11. The light separated by Faraday rotator 11 then passes through second birefringent lens 12. The light passing through second birefringent lens 12 is divided in two directions with a reference to a center of an optical fiber ferrule connected to first port 7A of multi-stage optical isolator 6 as shown in FIG. 5, so as to prevent the incident light from flowing into the input terminal.

As discussed above, the light passing through multi-stage optical isolator 6 is input to wavelength division multiplexer 2 as one input light. Because the input light is weak, the light input to wavelength division multiplexer 2 through source pump 3 as the other input light is modulated, and is from wavelength division multiplexer 2. Light having a wavelength of 980 or 1480 nanometers is from source pump 3. The modulating-output light is amplified by passing through optical fiber 7. Optical fiber 7 is wound around wavelength division multiplexer 2 and multi-stage optical isolator 6 which are positioned at a center thereof. A bending diameter of optical fiber 7 is more than five centimeters. The light amplified by passing through optical fiber 7 is again supplied to input port 7A of multi-stage optical isolator 6. The light incident on multi-stage optical isolator 6 passes through a lower portion of first lens 9 and then is incident on first birefringent lens 13 made of the polarization material $TiO_2$. The incident light is divided into vertical (normal)/horizontal (abnormal) polarized light by passing through a lower portion of first birefringent lens 13. If the length of first birefringent lens 13 is five millimeters, then the separation distance of the light is five hundred micrometers at a maximum. The light separated by first birefringent lens 13 passes through Faraday rotator 11, and its phase is shifted by 45 degrees. The phase shifted light, after passing through Faraday rotator 11, passes through second birefringent lens 12. As a result, the light which was separated by first birefringent lens 13 is united by shifting the phase by Faraday rotator 11 and then passing through second birefringent lens 12. The united light is input to optical fiber 7 connected to second lens 10. The light reflected on the cross-section of optical fiber 7 passes through second lens 10 and is again separated into vertical (normal)/horizontal (abnormal) polarized light in second birefringent lens 12. The separated light then passes through Faraday rotator 11. The light separated by Faraday rotator 11 passes through first birefringent lens 13. The light passing through first birefringent lens 13 is separated in two directions with a reference to a center of optical fiber ferrule connected to second port 7B of multi-stage optical isolator 6 as shown in FIG. 5, thereby to prevent the incident light from flowing into the input terminal.

As discussed above, the instant invention provides a light amplifier with an one multi-stage optical isolator in which a multi-stage connection is realized, thereby reducing a size thereof and cutting off a reverse flow of a forwarding light amplifier. According to the present invention, the multi-stage connection solves the problem found in contemporary designs using a multi-stage optical isolator, that being larger than other elements in the assembly, causes the size and fabrication cost of the light amplifier to be larger than necessary, and the problem of high connection losses between the optical fiber and the optical isolator attributable to the use of at least two optical isolators.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A light amplifier, comprising:
   a multi-stage optical isolator comprising two input ports disposed on one side of said isolator and two output ports disposed on another side of said isolator for cutting off a reverse flow of a forwarding light when said forwarding input light enters a first input port and when an output light enters a second input port, said isolator comprising the following elements arranged linearly in the following order:
   a first lens for focusing light input thereto;
   a first birefringent lens for dividing said focused light into vertically and horizontally polarized light;
   a Faraday rotator disposed adjacent said first birefringent lens for shifting a phase of said light divided by said first birefringent lens;
   a second birefringent lens disposed adjacent said Faraday for rotator focusing said phase-shifted light from said Faraday rotator; and
   a second lens disposed adjacent said second birefringent lens for irradiating said light focused by said second birefringent lens to a corresponding output port;
   a source pump for generating light;
   a wavelength division multiplexer connected to an output of said source pump and a first output port of said isolator for multiplexing wavelengths of said light generated by said source pump and said light forwarding through said multi-stage optical isolator; and
   an optical fiber connected between an output of said multiplexer and said second input port of said isolator for providing amplified light by amplifying light received from said wavelength division multiplexer, and for conveying said amplified light to said second input port of said multi-stage optical isolator;
   a second output port of said isolator being an output of the light amplifier.

2. The light amplifier of claim 1, wherein said source pump comprises a pump laser diode emitting light having a wavelength of one of 980 nanometers and 1480 nanometers.

3. The light amplifier of claim 1, comprised of:
   said optical fiber being wound around said multi-stage optical isolator and said wavelength division multiplexer; and
   said multi-stage optical isolator and said wavelength division multiplexer being positioned at a center of said wound optical fiber.

4. The light amplifier of claim 1, comprised of said optical fiber having a bending diameter of not less than five centimeters.

5. The light amplifier of claim 1, comprised of said Faraday rotator shifting phase of light passing therethrough by forty-five degrees.

6. The light amplifier of claim 2, comprised of:
   said optical fiber being wound around said multi-stage optical isolator and said wavelength division multiplexer; and
   said multi-stage optical isolator and said wavelength division multiplexer being positioned at a center of said wound optical fiber.

7. The light amplifier of claim 5, comprised of:
   said optical fiber being wound around said multi-stage optical isolator and said wavelength division multiplexer; and
   said multi-stage optical isolator and said wavelength division multiplexer being positioned at a center of said wound optical fiber.

* * * * *